(12) United States Patent  
Abu-Ageel

(10) Patent No.: US 7,306,344 B2
(45) Date of Patent: Dec. 11, 2007

(54) LIGHT GUIDE ARRAY, FABRICATION METHODS AND OPTICAL SYSTEM EMPLOYING SAME

(76) Inventor: Nayef M. Abu-Ageel, 45K Rolling Green Dr., Fall River, MA (US) 02720

( * ) Notice: Subject to any disclaimer, the term of this patent is extended or adjusted under 35 U.S.C. 154(b) by 421 days.

(21) Appl. No.: 10/458,390

(22) Filed: Jun. 10, 2003

(65) Prior Publication Data

US 2004/0252958 A1 Dec. 16, 2004

(51) Int. Cl.
*F21V 7/04* (2006.01)

(52) U.S. Cl. ..................... 359/838; 359/850

(58) Field of Classification Search ............... 359/40, 359/46, 48, 49, 251, 245, 246, 247; 353/81, 353/33
See application file for complete search history.

(56) References Cited

U.S. PATENT DOCUMENTS

| | | | | |
|---|---|---|---|---|
| 3,698,807 A | * | 10/1972 | Weigl | ............................ 355/45 |
| 4,765,718 A | | 8/1988 | Henkes | ........................ 350/345 |
| 4,874,227 A | * | 10/1989 | Matsukawa et al. | .......... 349/73 |
| 5,059,013 A | | 10/1991 | Jain | |
| 5,124,841 A | | 6/1992 | Oishi | |
| 5,396,350 A | * | 3/1995 | Beeson et al. | ................. 349/62 |
| 5,829,858 A | | 11/1998 | Levis et al. | .................. 353/122 |
| 6,024,452 A | | 2/2000 | Vanderwerf et al. | |
| 6,084,714 A | | 7/2000 | Ushiyama et al. | |
| 6,144,536 A | | 11/2000 | Zimmerman et al. | |
| 6,332,688 B1 | | 12/2001 | Magarill | ...................... 359/858 |
| 6,497,488 B1 | | 12/2002 | Yamauchi et al. | |
| 6,517,210 B2 | | 2/2003 | Peterson et al. | |
| 6,587,269 B2 | | 7/2003 | Li | |
| 6,730,940 B1 | | 5/2004 | Steranka et al. | |
| 6,869,206 B2 | | 3/2005 | Zimmerman et al. | |
| 6,910,772 B2 | | 6/2005 | Yano | |
| 6,960,872 B2 | | 11/2005 | Beeson et al. | |
| 7,025,464 B2 | | 4/2006 | Beeson et al. | |

FOREIGN PATENT DOCUMENTS

EP   1 315 022 A1   5/2003

* cited by examiner

*Primary Examiner*—David A. Vanore
(74) *Attorney, Agent, or Firm*—Gavrilovich, Dodd & Lindsey LLP

(57) ABSTRACT

A light guide array for outputting light with improved uniformity and collimation includes a supporting material and a plurality of light guides formed in the supporting material. Each of the light guides has an entrance aperture for receiving light and an exit aperture for outputting light. The light guides can be solid pipes or hollow tunnels passing through the supporting material. The supporting material can be a metal, such as Al, Au, Ni, a semiconductor material, such as silicon, poly-silicon, SiC, GaAs, or an optically transparent material. Semiconductor fabrication techniques can be used to build the array. The array can be incorporated into an optical projection system to improve performance.

20 Claims, 20 Drawing Sheets

LIGHT GUIDE ARRAY, FABRICATION METHODS AND OPTICAL SYSTEM EMPLOYING SAME

TECHNICAL FIELD

The invention relates generally to optical systems that convert non-homogeneous light from light sources into substantially homogeneous and collimated illumination. More particularly, the invention relates to an optical system, including a compact light guide array for delivering substantially uniform and collimated light to an area such as that of a light valve.

BACKGROUND

Light valves based on liquid crystal display technology, as well as MEMS (Micro-electro-mechanical systems) technology, have been used in various systems and applications, which include but are not limited to projectors, projection TVs, camcorders, digital still cameras, internet appliances, cell phones and headsets. In most of light valve applications, low cost, compactness and lightweight of the illumination system is desired. In addition, a uniform, bright and stable image is an important requirement in such applications.

FIGS. 1A and 1B show examples of prior art straight 10 and tapered 20 light guide integrators, respectively, that increase light uniformity in various known illumination systems.

The straight light guide 10 can be a solid glass rod with polished surfaces, or alternatively, a hollow tunnel with reflective surfaces. The light enters the entrance aperture 1 and emerges from the exit aperture 2 more uniformly after experiencing multiple reflections, in case of hollow light tunnels, or multiple total internal reflections, in case of solid light rods. The light uniformity at the exit aperture 2 increases with the increase in the length L of the light guides 10, 20.

As shown in FIG. 1A, the entrance 1 and exit 2 apertures of the straight light guide 10 have equal $W_1 \times W_2$ cross-sectional areas.

The tapered light guide 20 of FIG. 1B delivers more uniform and collimated light in comparison with straight light guides of FIG. 1A. A tapered light guide 20 usually has unequal cross-sectional areas $A_1$, $A_2$ at its entrance and exit apertures 3,4. Entrance 3 and exit 4 apertures can have unequal sizes and similar aperture shapes such as square, rectangular or circular, as well as unequal sizes and different aperture shapes. Such light guides have been described in U.S. Pat. No. 6,332,688, to Magarill, U.S. Pat. No. 5,829,858 to Levis and U.S. Pat. No. 4,765,718, to Henkes.

Known light integrating technologies suffer from inefficiency in light coupling and lack of compactness. Therefore, there is a need for a compact, lightweight, efficient and cost-effective illumination system to provide uniform and collimated light over a predefined area, such as the active area of a light valve.

SUMMARY OF THE INVENTION

It is an advantage of the present invention to provide a relatively compact, light weight, efficient and cost-effective illumination system capable of producing a light beam, of selected cross-section and uniform intensity, which emits into a selected numerical aperture of emission. Furthermore, the illumination system can efficiently couple light from sources having a wide variety of sizes and shapes into light valves of various shapes and sizes.

A feature of the invention is the focusing of the light beam into an array of micro-guides capable of setting the numerical aperture as well as providing the desired uniformity. Micro-tunnels (hollow micro light guides) as well as micro-pipes (solid micro light guides) of selected shapes and sizes can be used to form arrays of selected shapes and sizes.

One embodiment of the invention uses straight and/or tapered micro-tunnels to form an array of micro light guides that provides uniform light distribution over a certain area with a desired cone angle (numerical aperture) population.

Another embodiment uses arrays with straight and/or tapered micro-pipes instead of micro-tunnels in order to provide the same function.

A further embodiment of the invention provides a projection system utilizing micro-guides such as those disclosed and described herein.

Additional embodiments of the invention provide fabrication methods of such micro-guide arrays.

Other embodiments, features and advantages of the invention will be or will become apparent to one with skill in the art upon examination of the following figures and detailed description. It is intended that all such additional features, embodiments and advantages be included within this description, be within the scope of the invention, and be protected by the accompanying claims.

It is to be understood that the drawings are solely for purposes of illustration and not as a definition of the limits of the invention. Furthermore, it is to be understood that the drawings are not necessarily drawn to scale and that, unless otherwise stated, they are merely intended to conceptually illustrate the structures and methods described herein.

DETAILED DESCRIPTION

Described herein are: micro-tunnel and micro-pipe arrays, their fabrication methods, and optical systems employing the arrays.

Figure 1A:
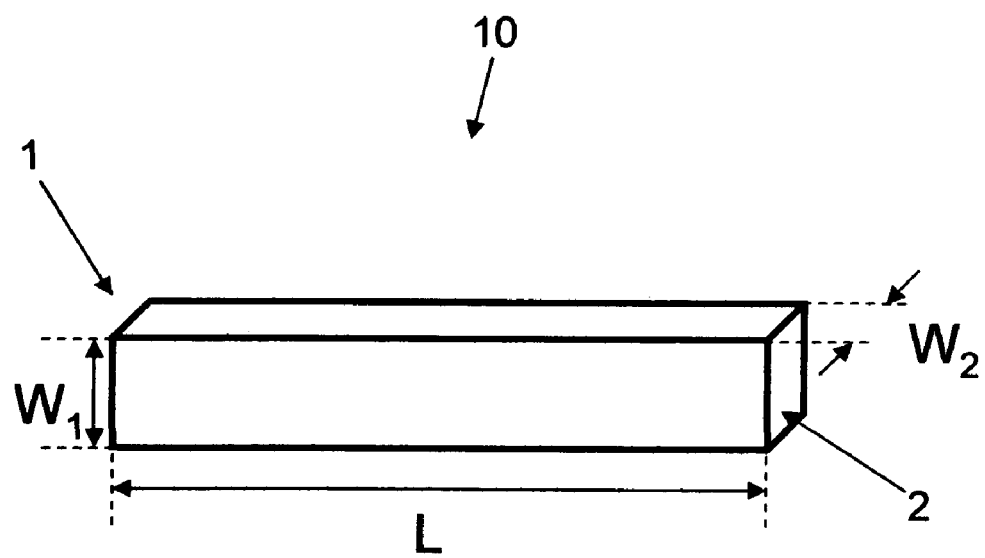
FIG. 1A shows a perspective view of a prior art straight light guide.
Figure 1B:
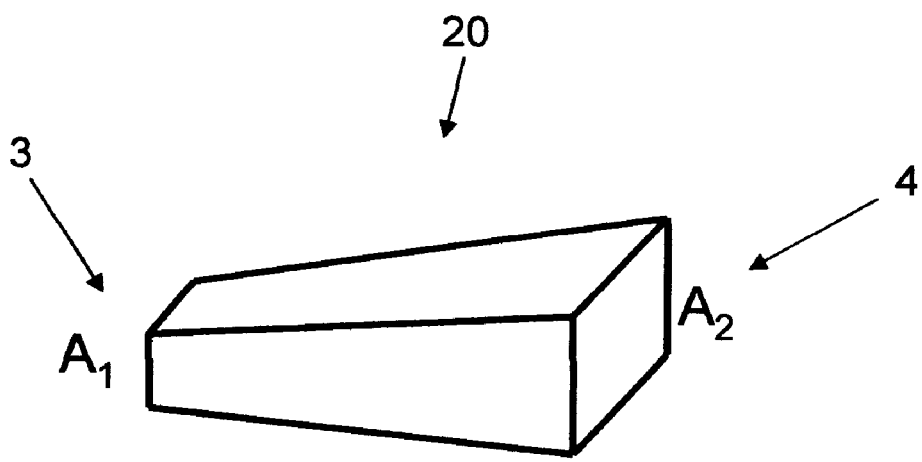
FIG. 1B shows a perspective view of a prior art tapered light guide.
Figure 2A:
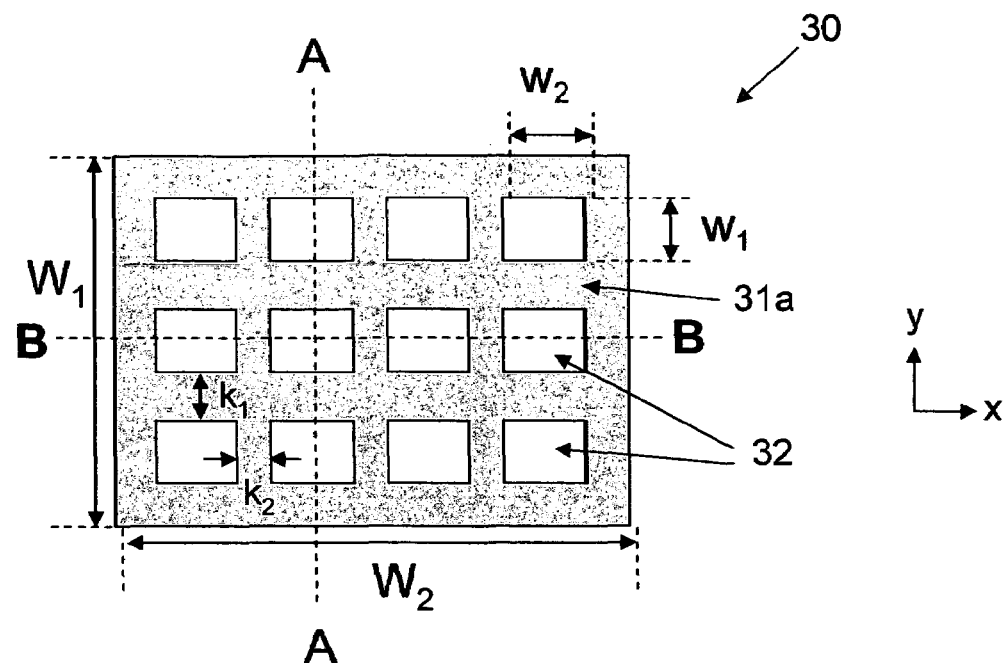
FIG. 2A shows a top down view of a two-dimensional rectangular micro-tunnel array in accordance with an embodiment of the present invention.

FIGS. 2A-2J show straight and tapered micro-tunnel arrays in accordance with various embodiments of the invention. FIG. 2A shows a plan view of a two-dimensional micro-tunnel array system 30, which consists of micro-tunnels 32 arranged in two dimensions (x and y) and outputs a relatively uniform distribution of light over an area. Although the invention is not so limited, a micro-tunnel array 30 can have micro-tunnels 32 numbering from a few to millions, with each micro-tunnel being distinct in terms of size and shape of its cross section. For simplicity of illustration, the array 30 is shown to have twelve micro-tunnels 32 arranged in three rows and four columns. Each micro-tunnel 32 has a $w_1 \times w_2$ cross-section area, and the array 30 has a cross section area of $W_1 \times W_2$.

The invention is not limited to any particular values for $w_1$, $w_2$, $W_1$ and $W_2$. However, $w_1$ and $w_2$ can range from few microns to few millimeters, and $W_1$ and $W_2$ can range from few millimeters to few centimeters. These dimensions are usually limited by available fabrication techniques and can be selected based on the particular application of the array.

Figure 2B:
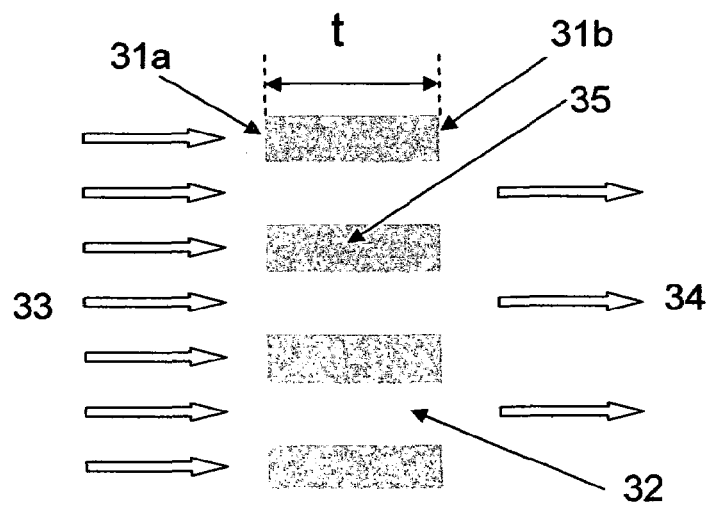
FIG. 2B shows a cross sectional view of a straight micro-tunnel array along line A of FIG. 2A.

FIG. 2B shows a cross sectional view of FIG. 2A taken along line A. The micro-tunnels 32 of FIG. 2B are of the straight type (as shown in the example given in FIG. 2C) but can be also of the tapered type (examples shown in FIGS. 2F and 2H). As shown in FIG. 2B, the micro-tunnels 32 length and the frame 35 thickness t are equal. The supporting frame 35 material can be, but is not limited to glass, Al, Au, Ni, silicon, poly-silicon, SiC and/or GaAs. The frame 35 is preferably a supporting material thick enough to support the whole array 30. The light incident 33 upon the entrance aperture of the array 30 is partly transmitted 34 through the micro-tunnels 32. The rest of the light is reflected and/or absorbed by the frame surface 31a. The light that enters the micro-tunnels 32 may experience some or no reflections at all depending on the length of micro-tunnel 1 and angle of incidence of the light beam 33 upon the entrance aperture of each micro-tunnel 32.

Figure 2C:
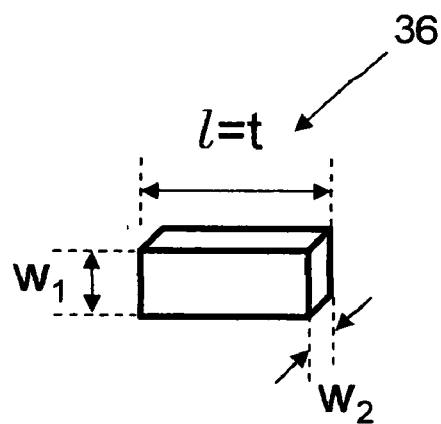
FIG. 2C shows a perspective view of a straight micro-tunnel that can be included in the array of FIG. 2B.

FIG. 2C shows a perspective view 36 of an example of a straight micro-tunnel 32 with a $w_1 \times w_2$ cross sectional area and a length l, which can be included in the array 30 of FIG. 2A. The internal surface of each micro-tunnel 32 is either reflective or coated with a reflective material such as aluminum, silver and/or dielectric mirror (i.e., alternating layers of low-index and high index dielectric materials such as $SiO_2$ and $TiO_2$). This internal reflective coating can be a cold mirror coating, thus leading to the removal of a portion or all of infrared (IR) heat from the incident light beam 33 without the use of transmissive heat filters, which can reduce the visible light in the beam. Deposition techniques, such as sputtering, thermal or e-beam evaporation, plating and/or electroplating can be used to coat the internal micro-tunnel 32 surface and/or the outer frame surfaces 31a and 31b with a reflective layer(s).

The cross-section (i.e., entrance aperture) of each micro-tunnel 32 in an array 30 can have a size and shape independent of other micro-tunnels 32 within the array 30. In general, there is no constraint on the shape of entrance aperture of a micro-tunnel. Shapes such as square, triangular, rectangular, circular, oval, and combinations of various shapes within an array 30 are contemplated by the invention. In addition, the cross-section (i.e., entrance aperture) of the entire array 30 can have various sizes and shapes independent of the individual sizes and shapes of micro-tunnel entrance apertures.

Figure 2D:
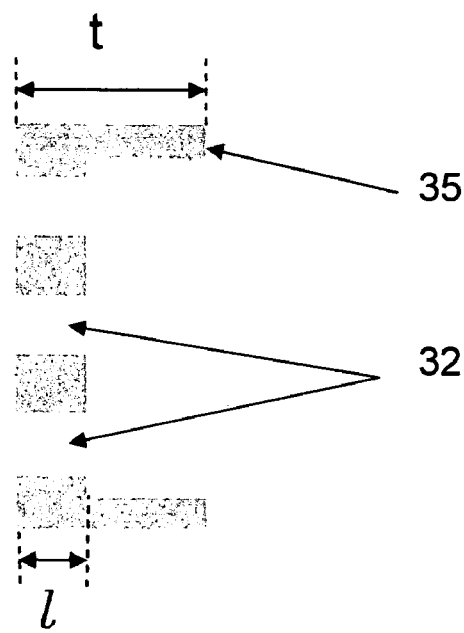
FIG. 2D shows a cross sectional view of a straight micro-tunnel array along line A of FIG. 2A, where the micro-tunnel length l is smaller than the frame thickness t.
Figure 2E:
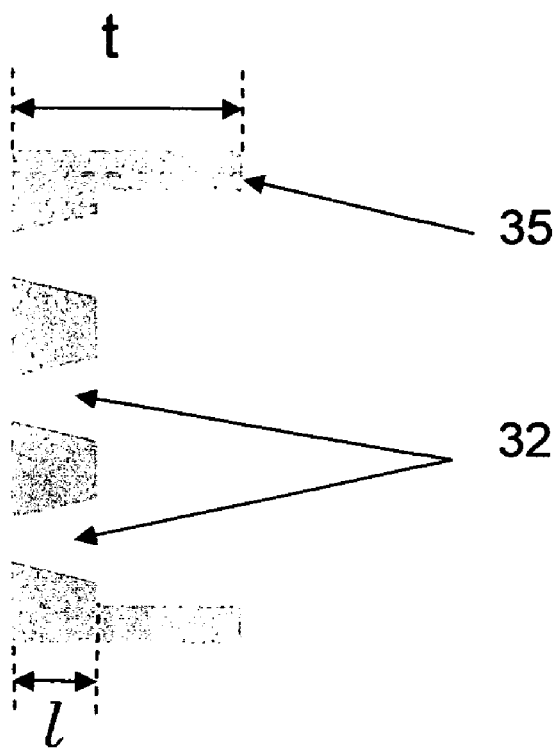
FIG. 2E shows a cross sectional view of a tapered micro-tunnel array along line A of FIG. 2A, where the entrance aperture is smaller than the exit aperture and the micro-tunnel length l is smaller than the frame thickness t.
Figure 2F:
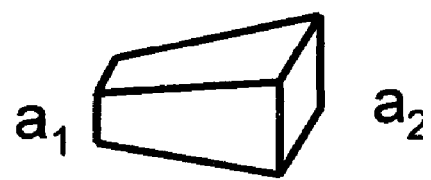
FIG. 2F shows a perspective view of a tapered micro-tunnel of FIG. 2E, where the dimensions of entrance and exit apertures are $a_1$ and $a_2$, respectively.
Figure 2G:
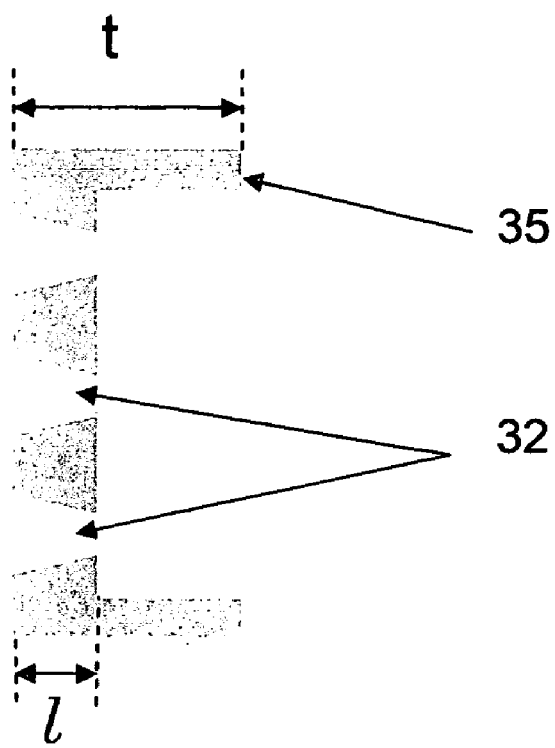
FIG. 2G shows a cross sectional view of a tapered micro-tunnel array along line A of FIG. 2A, where the entrance aperture is larger than the exit aperture and the micro-tunnel length l is smaller than the frame thickness t.
Figure 2H:
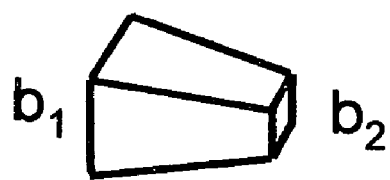
FIG. 2H shows a perspective view of a tapered micro-tunnel of FIG. 2G, where the dimensions of entrance and exit apertures are $b_1$ and $b_2$, respectively.
Figure 2I:
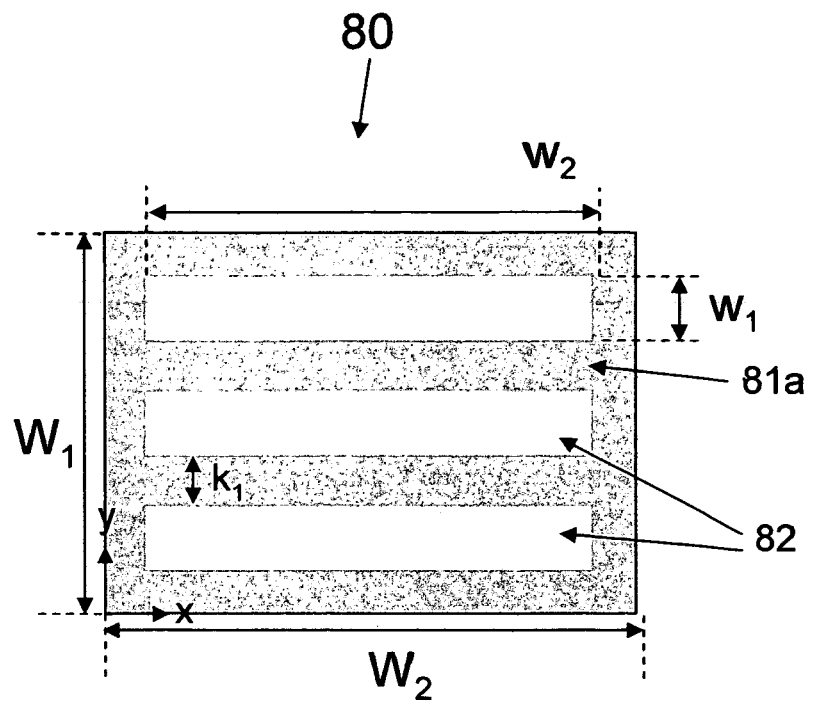
FIG. 2I shows a top view of a one-dimensional rectangular micro-tunnel array.

A micro-tunnel array 80 can be one-dimensional, as shown in FIG. 2I. The micro-tunnels 82 are arranged in one dimension along the y-axis. This array 80 delivers more uniform light distribution along the y-axis in this case without impacting light uniformity along the x-axis.

Figure 2J:
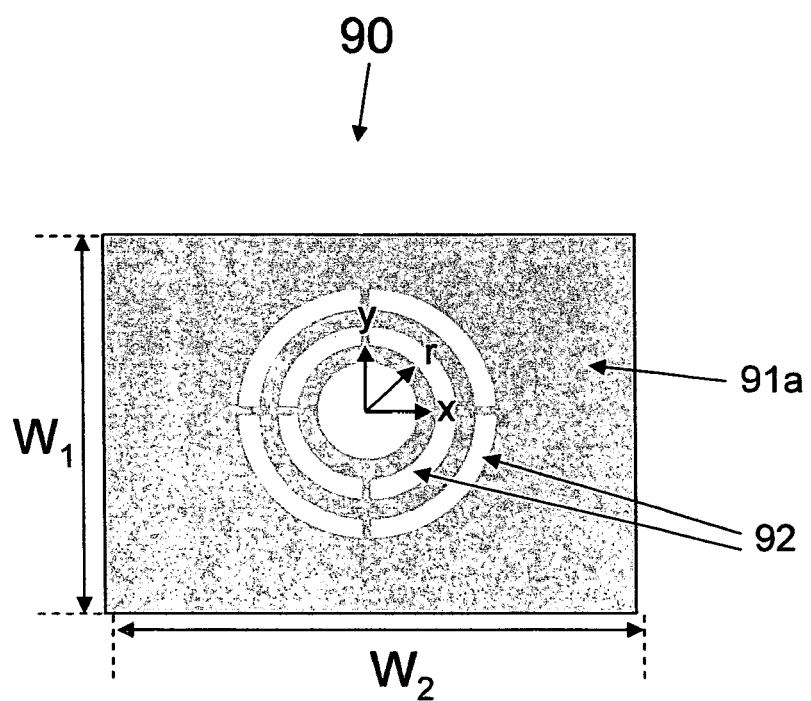
FIG. 2J shows a top view of an array with rings of micro-tunnels.
Figure 2K:
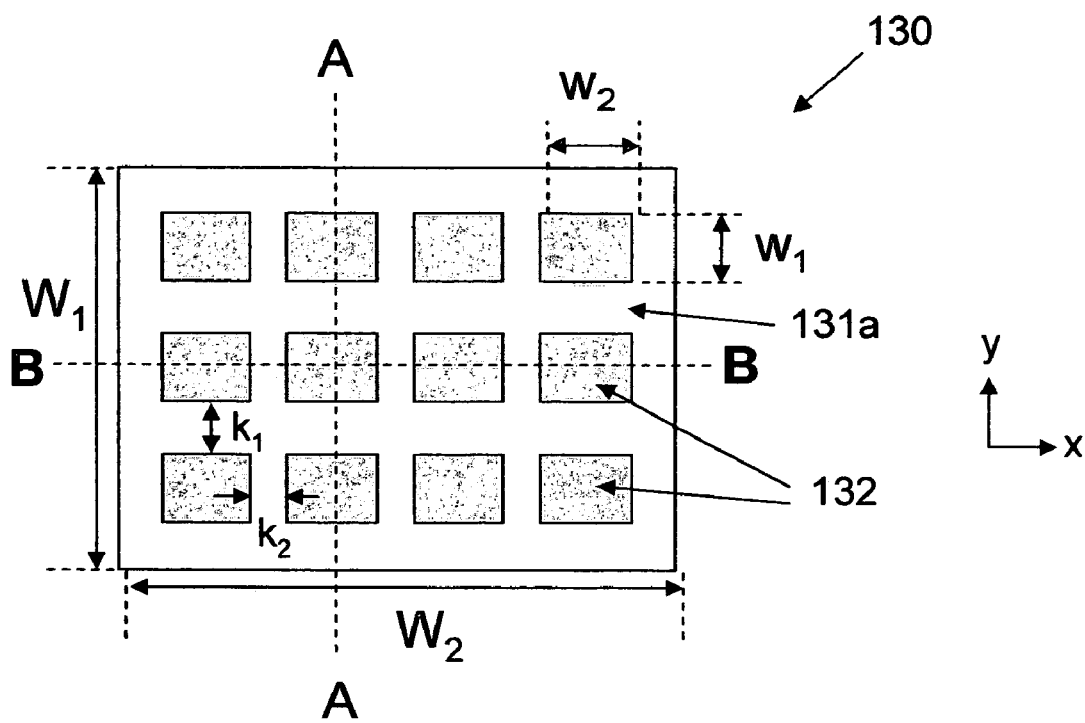
FIG. 2K shows a top view of a two-dimensional rectangular micro-pipe array in accordance with another embodiment of the invention.
Figure 2L:
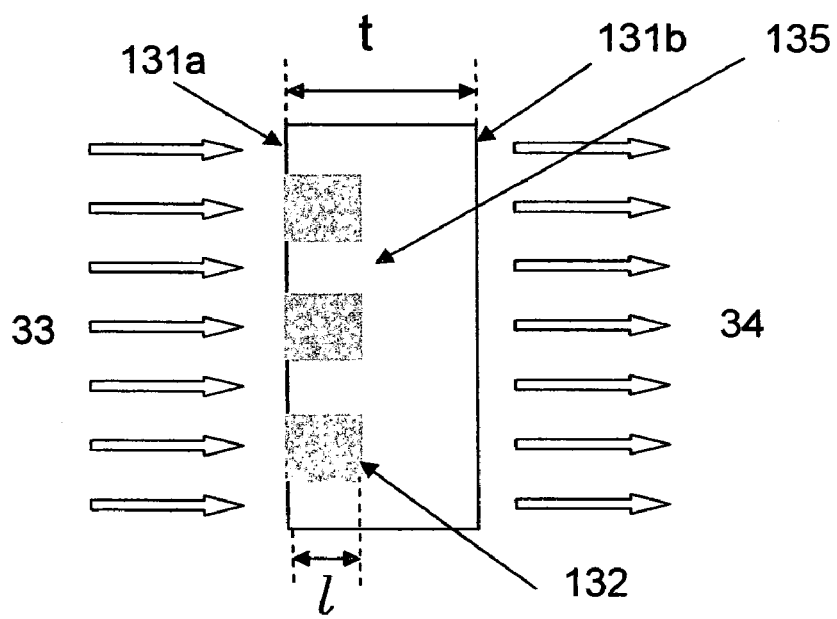
FIG. 2L shows a cross sectional view of a straight micro-pipe array along line A of FIG. 2K.
Figure 2M:
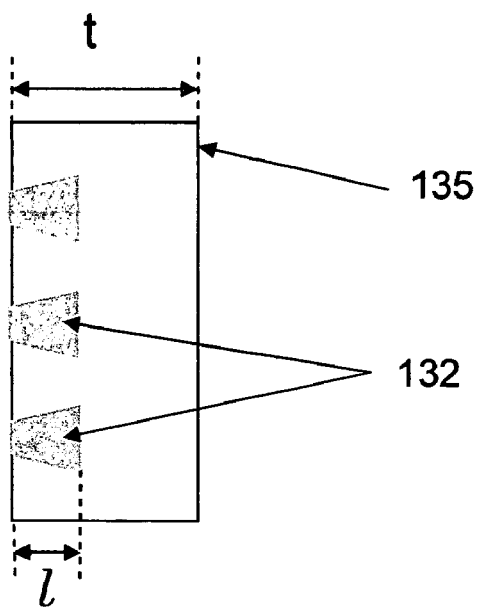
FIG. 2M shows a cross sectional view of a tapered micro-pipe array along line A of FIG. 2K, where the entrance aperture is smaller than the exit aperture and the micro-pipe length l is smaller than the substrate thickness t.
Figure 2N:
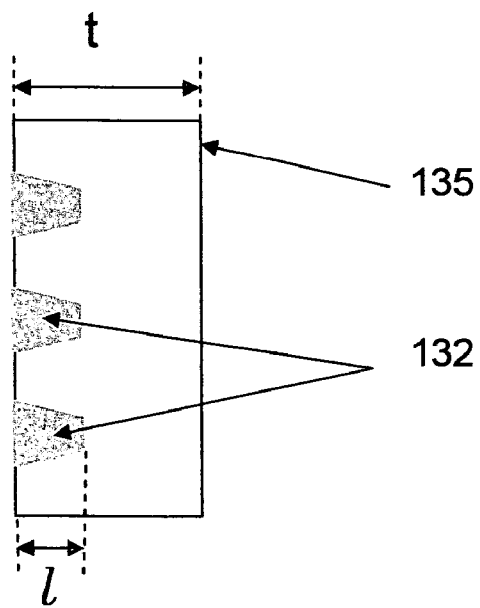
FIG. 2N shows a cross sectional view of a tapered micro-pipe array along line A of FIG. 2K, where the entrance aperture is larger than the exit aperture and the micro-pipe length l is smaller than the substrate thickness t.

FIG. 2J shows an array 90 with rings of micro-tunnels 92 arranged along the radius r, which is capable of delivering uniform light along x- and y-axes.

The ratio of the total cross-section area of the micro-tunnels to the total area of the array defines the micro-tunnel density of the array. For example, the micro-tunnel density of array 30 of FIG. 2A is $(12 \times w_1 \times w_2)/(W_1 \times W_2)$. This ratio can be increased by reducing $k_1$ and/or $k_2$, i.e., the frame 31 area surrounding the micro-tunnels 32.

The ratio of transmitted light 34 to incident light 33 defines the transmission ratio of the micro-tunnel array 30. The transmission ratio increases as the micro-tunnel density increases and both can be equal when the received light 33 and/or the micro-tunnels 32 are uniformly distributed over the array area $W_1 \times W_2$.

The length l (preferably several microns to several hundreds of microns) of the straight micro-tunnels 32 can be smaller than the frame 35 thickness t (preferably several hundreds of microns to several millimeters), as shown in FIG. 2D. In this case, portions of the frame 35 can be made thick enough to provide extra support to the whole micro-tunnel array 30. A perspective view of this straight micro-tunnel is similar to that shown in FIG. 2C, except with a micro-tunnel length l less than the frame 35 thickness t.

Micro-tunnels 32 of array 30 can be tapered rather than straight as shown in FIGS. 2E and 2G. The entrance aperture $a_1$ of the tapered micro-tunnel 32 of FIG. 2F is smaller than the exit aperture $a_2$. In FIG. 2E, the micro-tunnel length l is shown smaller than t but can be extended to the full thickness t of the frame 35.

The tapered micro-tunnel 32 can be reversed as shown in FIGS. 2G and 2H such that the entrance aperture $b_1$ of the tapered micro-tunnel 32 is larger than the exit aperture $b_2$ and the length of the micro-tunnel is l<t. This type of micro-tunnel array delivers light which is less uniform than the received light.

In alternative embodiments of the invention shown in FIGS. 2K-2N, the homogenization and collimation of light is performed using a micro-pipe array 130 rather than a micro-tunnel array. The array 130 consists of solid micro-pipes 132, which are made of an optically transmissive material with optically smooth back and front surfaces. In order to have total internal reflection (i.e., the reflection of the total amount of incident light at the boundary between two medium) within a micro-pipe 132, the index of refraction of the micro-pipe 132 itself has to be larger than that of the material 135 surrounding the micro-pipe 132 and angle of incidence of light needs to be greater than the critical angle. Both the micro-pipes 132 and surrounding materials 135 can be optically transparent, thus allowing received light 33 to be fully transmitted 34 through the array 130, except for Fresnel reflections, i.e., the reflections of a portion of incident light at a discrete interface between two medium having different refractive indices.

Light incident 33 upon the entrance aperture of the micro-pipe 132 is guided within the micro-pipe 132 through total internal reflection. Light incident outside micro-pipe 132 entrance apertures gets transmitted through without experiencing total internal reflection.

Micro-pipes 132 of array 130 can be straight (FIG. 2L) and/or tapered (FIGS. 2M-2N) with their length being l<t. In principal, there is no constraint on shape and size of the overall micro-pipe array 130 or the shapes and sizes of micro-pipes 132 within the array 130. The arrays of FIGS. 2A-2J can also be implemented using micro-tunnel arrays combined with micro-pipe arrays.

Figure 3A:
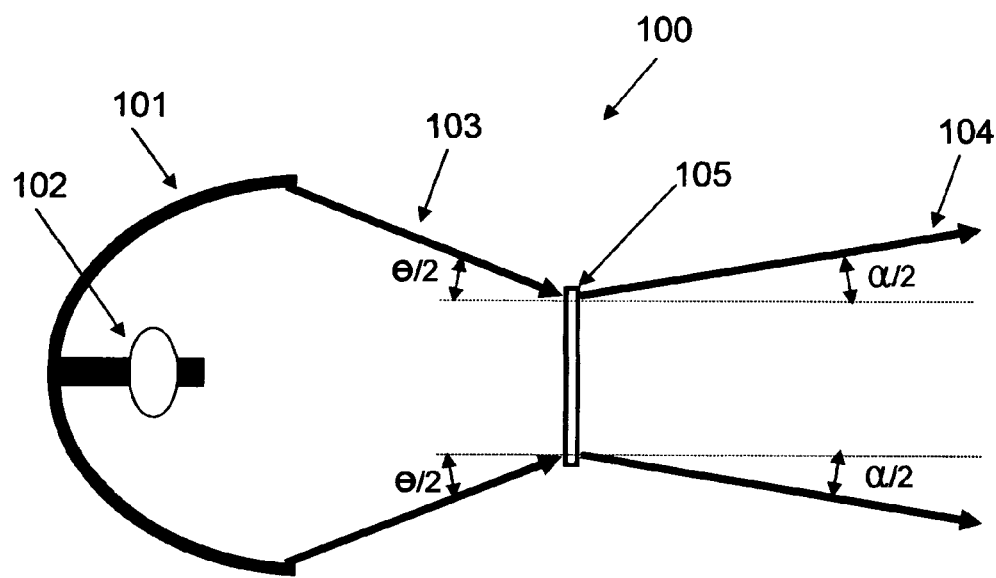
FIG. 3A shows a cross sectional view of a first illumination system that uniformizes and collimates a light beam in accordance with an embodiment of the invention.
Figure 3B:
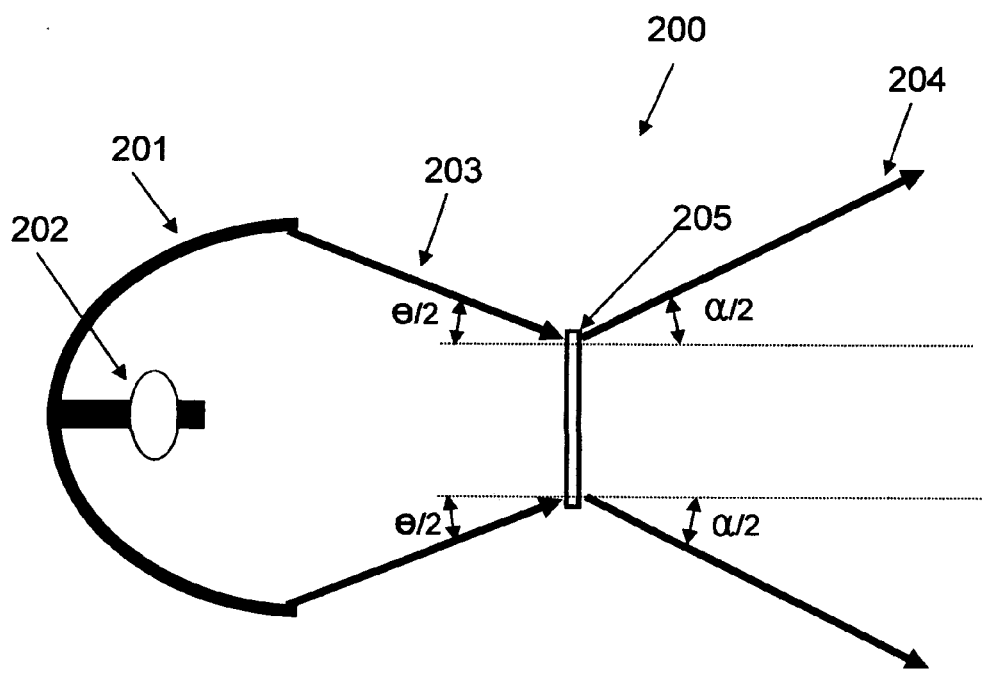
FIG. 3B shows a cross sectional view of a second illumination system that uniformizes and reduces collimation of a light beam in accordance with an embodiment of the invention.

In accordance with a further embodiment of the invention, illumination systems 100 and 200 receive light beams 103 and 203 and use micro-tunnel arrays of FIGS. 2E and 2G, respectively, as shown in FIGS. 3A-3B. Alternatively, micro-pipe arrays of FIGS. 2M and 2N can be used instead of micro-tunnel arrays of FIGS. 2E and 2G, respectively, to implement systems 100, 200 of this embodiment.

FIG. 3A shows an illumination system 100 that produces uniform and more collimated light beam when compared to illumination system 200 of FIG. 3B. In FIG. 3A, an exemplary light beam 103 with a cone angle θ is received by micro-tunnel array 105 from a light source 102 housed in an elliptical mirror 101. Micro-tunnel array 105 homogenizes and collimates received light beam 103, delivering uniform light beam 104 with a cone angle α<θ.

Illumination system 200 of FIG. 3B receives a light beam 203 with a cone angle θ and produces a uniform and less collimated light beam 204 with a cone angle α>θ.

Figure 3C:
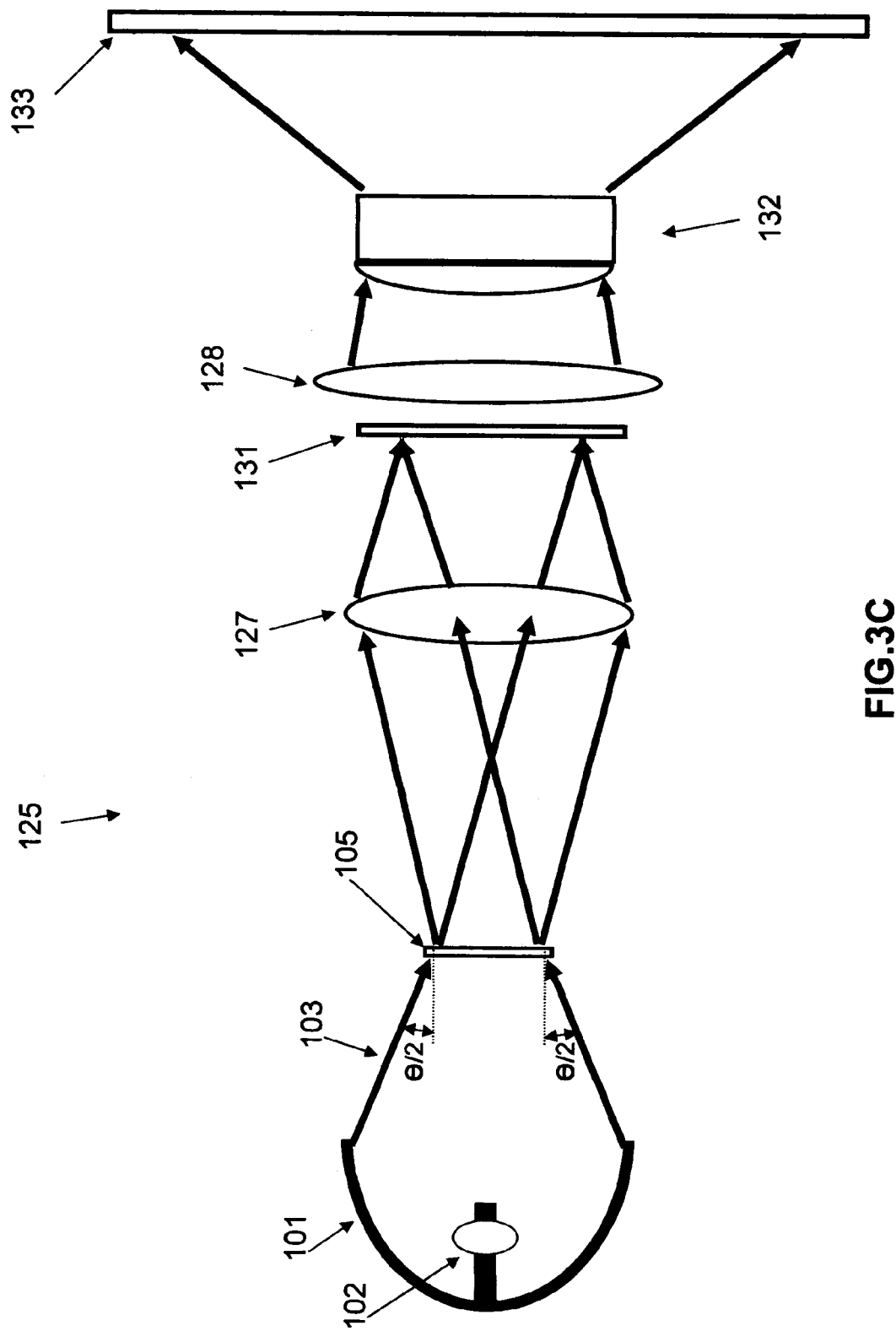
FIG. 3C shows a cross sectional view of a projector system in accordance with an embodiment of the invention.

FIG. 3C shows projection system 125 that uses a transmissive LCD (liquid crystal display) panel 131. Other panel types such as reflective LCOS (liquid crystal on silicon) and DMD (digital micro mirror) can be used. The projection systems 125 include a light source 102 housed in an elliptical mirror 101 and a micro-tunnel array 105 that homogenizes and collimates received light beam 103.

As shown in FIG. 3C, the light exits the micro-tunnel array 105 and is transmitted through relay optics, such as a condenser lens 127. The condenser lens 127 illuminates and focuses, in a superimposing manner, the light output from the light guide array onto the image gate (entry face) of a light valve (LCD panel) 131. The light beam passed through the light valve 131 is focused by a field lens 128 into the aperture of a projection lens 132. The image displayed on the light valve 131 is projected onto a screen 133.

Figure 4A:
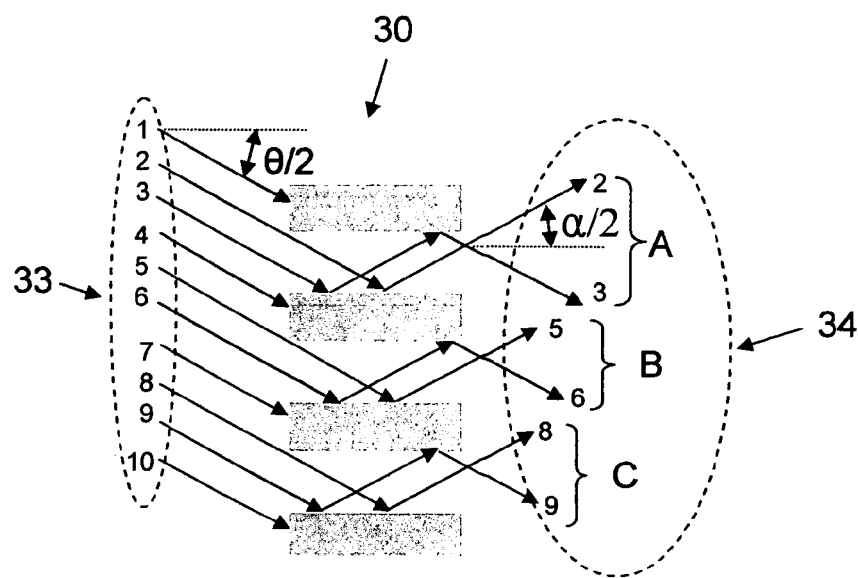
FIG. 4A shows a cross sectional view of a straight micro-tunnel array of FIG. 2B and illustrates its function of splitting a light beam into sub-beams. The incident light beam has a uniform angle of incidence.
Figure 4B:
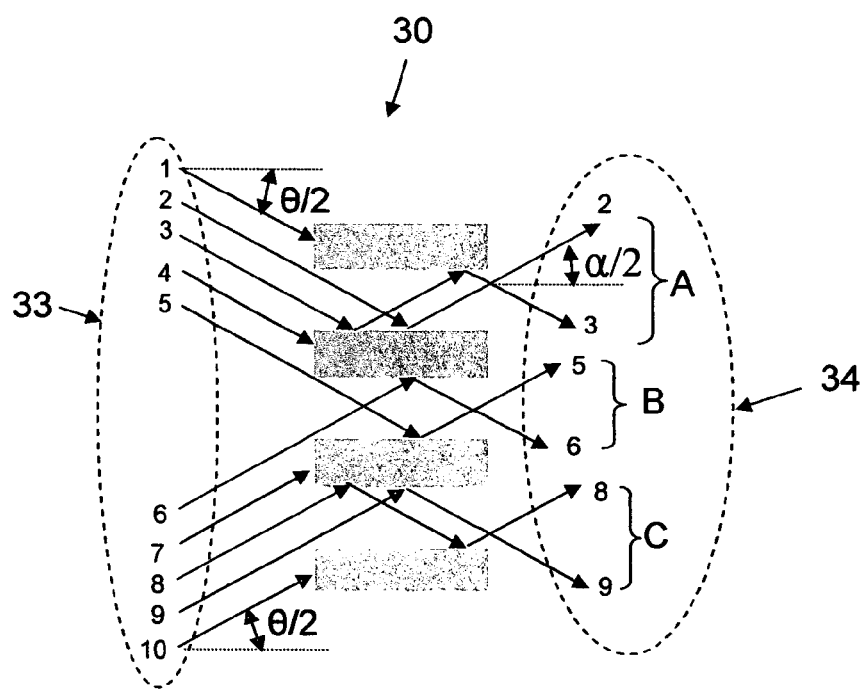
FIG. 4B shows a cross sectional view of a straight micro-tunnel array of FIG. 2B and illustrates its function of splitting a light beam into sub-beams. The first half of micro-tunnel array receives one part of light beam with angle of incidence $+\theta/2$ and the second half receives second part of light beam with angle of incidence $-\theta/2$.

The homogenization of a light beam by a straight micro-tunnel array 30 is illustrated in FIGS. 4A-4B, which show cross sectional views of FIG. 2A along line A with exemplary received 33 and delivered 34 light beams. As shown in FIGS. 4A-4B, a straight micro-tunnel array 30 splits the light beam 33 received from a non-homogeneous light source into a large number of sub-beams A-C equal to the number of the micro-tunnels 32 in the array 30. For illustration simplicity, the light beam 33 is illustrated as having ten rays 1-10, each of which have a uniform angle of incidence 0. In addition, the exemplary array 30 has only three rows of micro-tunnels 32. An array 30 can have any suitable number of pipes or tunnels, up to and including hundreds of thousands or even millions of micro-tunnels 32 or pipes.

The transmitted light 34 includes three sub-beams A, B and C emerging from the corresponding micro-tunnels 32, as shown in FIGS. 4A-4B. Sub-beam A consists of rays 2 and 3, sub-beam B consists of rays 5 and 6 and sub-beam C consists of rays 8 and 9. Rays 1, 4, 7 and 10 are reflected and/or absorbed by the frame surface 31a. Each sub-beam experiences a number of reflections within the corresponding micro-tunnel depending on the micro-tunnel length 32 and angle of incidence θ/2 of light rays. The sub-beams A, B and C exit micro-tunnels 32 with a cone angle α and spread over the light valve area (not shown) leading to a highly uniform distribution of light. In this case, the cone angle α of light beam 34 is equal to angle θ of received beam 33. It is possible to decrease the cone angle α (i.e., resulting in more collimated light) by using tapered micro-tunnels of FIGS. 2E-2F, rather than the straight micro-tunnels of FIGS. 2C-2D.

In case of micro-pipe arrays 130, the above discussion applies considering that light rays experience total internal reflection within the micro-pipes rather than reflections.

The micro-tunnel 30 and micro-pipe 130 arrays disclosed herein (FIGS. 2A-2N) have at least four advantages over known light guides 10 and 20. First, the micro-tunnel 30 and micro-pipe 130 arrays provide a superior level of compactness and light-weight. The length (l<t) of the these arrays 30 and 130 is lower than the length of known light guides 10 and 20 by one to three orders of magnitude resulting in very compact light-weight systems. Second, the micro-tunnel 30 and micro-pipe 130 arrays can provide higher level of light uniformity due to the large number of virtual sources formed by these arrays 30 and 130. Images of these virtual sources are superimposed on top of each other forming an extremely uniform distribution of light over a certain area, such as the light valve area. Third, higher coupling efficiency between the light source and the light valve can be provided by the micro-tunnel 30 and micro-pipe 130 arrays resulting in more efficient use of light by the light valve. In this case, the micro-tunnel 30 and micro-pipe 130 arrays lower the cone angle population of the light beam delivered to the light valve thus enhancing coupling efficiency. Fourth, the micro-tunnel 30 and micro-pipe 130 arrays can be mass produced in an integrated circuit (IC) like process, thus providing a cost effective solution.

Micro-tunnel and micro-pipe arrays disclosed herein can be made using various processes including, but not limited to, standard photolithography, silicon surface micromachining, silicon bulk micromachining, LIGA, HEXSIL, electro-forming of high aspect ratio structures, nano-technology techniques and combinations of two or more of these methods.

An exemplary method of fabricating micro-tunnel arrays 30 is shown in FIGS. 5A-5E. A cross sectional view of a structure for forming the array illustrated along line B of FIG. 2A is shown in FIGS. 5A-5E.

Figure 5A:
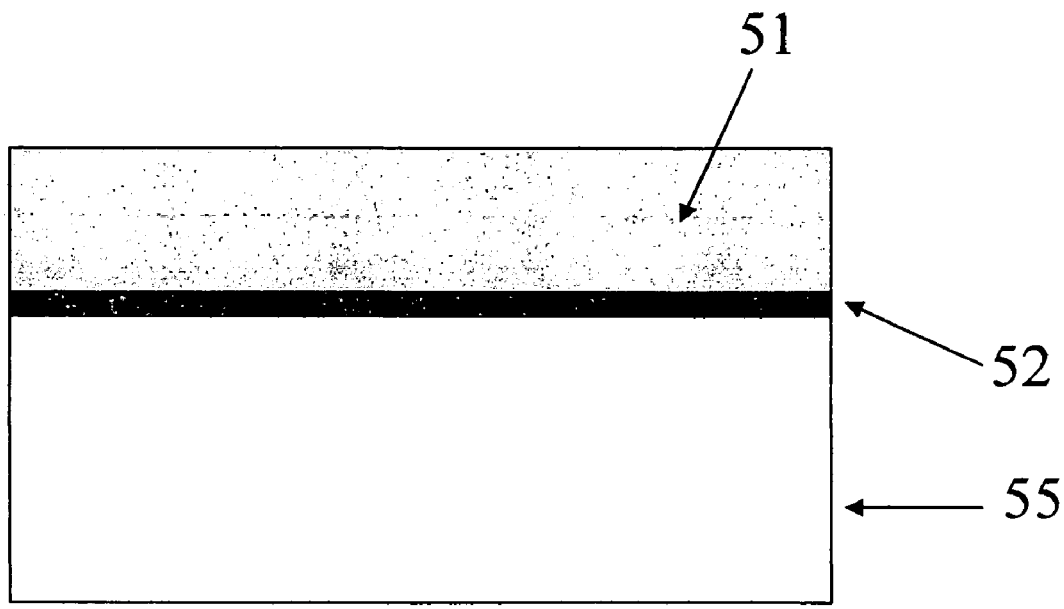
FIGS. 5A-5H show fabrication steps of micro-tunnel arrays using SOI wafers in accordance with an embodiment of the invention.

FIG. 5A shows a first layer 51, an insulating layer 52 and an optional substrate 55. Layer 51 can be made of metals such as Al, Au and Ni, but can also be made of single-crystalline, poly-crystalline or amorphous semiconducting and/or insulating materials such as Si, SiC, Ge, GaAs, InP, diamond, and combinations thereof. Layer 52 is preferably thermally grown silicon oxide but can be made of other insulating materials (e.g. silicon nitride) that can act as an etch stop during the etching of substrate 55. Substrate layer 55 can be silicon and can be, but is not limited to, a combination of one or more of the following materials: single-crystalline silicon, poly-crystalline silicon, amorphous silicon, single-crystalline silicon carbide, poly-crystalline silicon carbide, single-crystalline silicon germanium, poly-crystalline silicon germanium, single-crystalline diamond, poly-crystalline diamond, glass, ceramic, metal (e.g., Au, Al, and Ni), silicon nitride, and silicon oxide.

The structure shown in FIG. 5A is preferably a silicon-on-insulator (SOI) structure. For such SOI structures, standard integrated circuits (IC) fabrication tools and procedures, such as photolithography, Reactive Ion Etching (RIE), deep RIE, doping, diffusion, annealing, ion implantation, metal deposition, and growth and deposition of silicon oxide, silicon nitride, and the like can be used in the fabrication process.

Figure 5B:
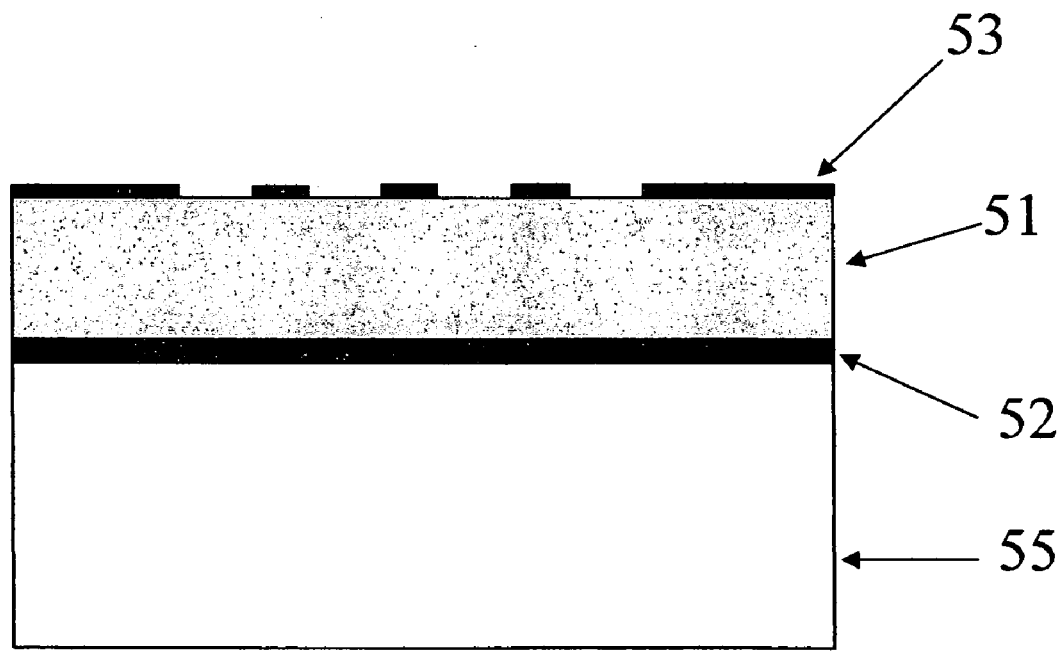

FIG. 5B shows a cross sectional view of a patterned layer 53, which defines a micro-tunnel array. The layer 53 is deposited on top of layer 51 and patterned as shown in FIG. 5B. This patterned layer 53 acts as a masking layer during the process of etching layer 51. This masking layer 53 can be silicon oxide, silicon nitride, photoresist or another suitable material.

Figure 5C:
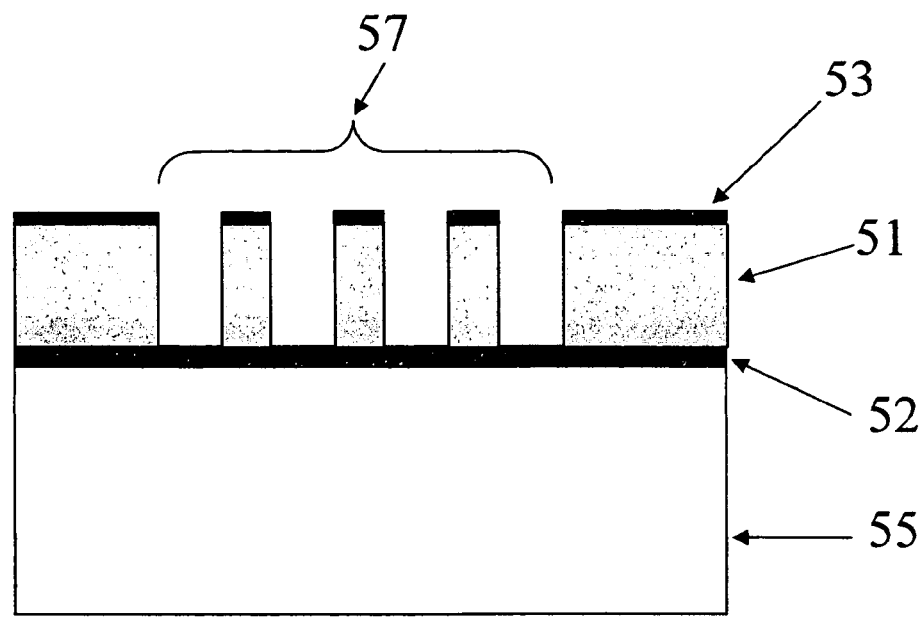
Figure 5D:
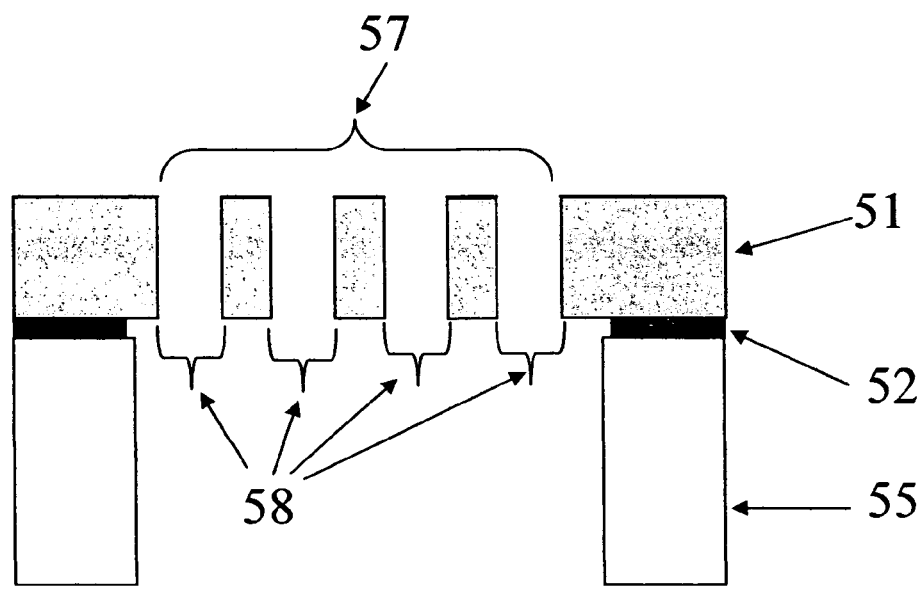
Figure 5E:
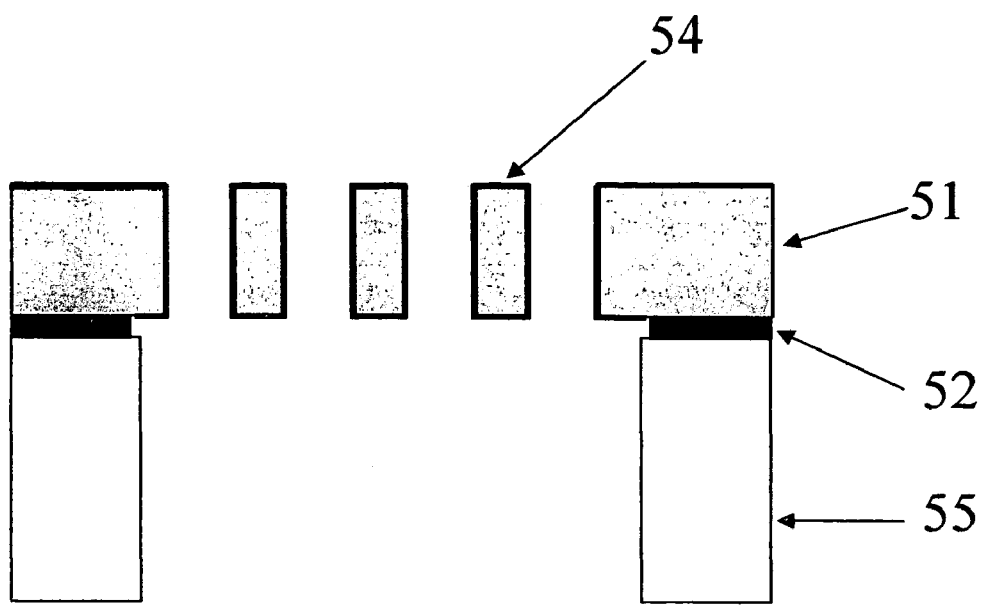

FIG. 5C shows a cross sectional view of micro-tunnel array 57 after etching layer 51 in the areas that have no masking protection using, for example, Reactive Ion Etching (RIE) or deep Reactive Ion Etching (DRIE). A portion of the optional substrate layer 55 and the masking layer 53 are removed as shown in FIG. 5D using wet etching techniques such as KOH or dry etching techniques such as DRIE. The insulating layer 52 is subsequently removed as shown in FIG. 5D using appropriate etch techniques such as Reactive Ion Etching (RIE) or a timed wet etching to clear the micro-tunnels exit apertures 58. At this point, a reflective layer 54 is deposited on the micro-tunnels internal side-walls and front side of the array. In addition, the backside of the array may be coated with this reflective layer as shown in FIG. 5E. The reflective layer 54 can be Al, Au, silver, dielectric mirror or a combination of a metal layer and dielectric layers. Deposition techniques include, but are not limited to, evaporation, sputtering, plating and chemical vapor deposition.

Figure 5F:
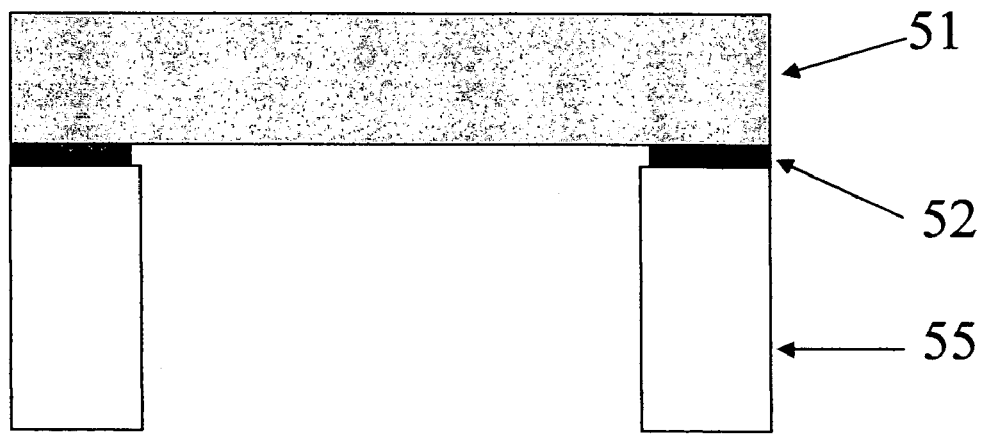
Figure 5G:
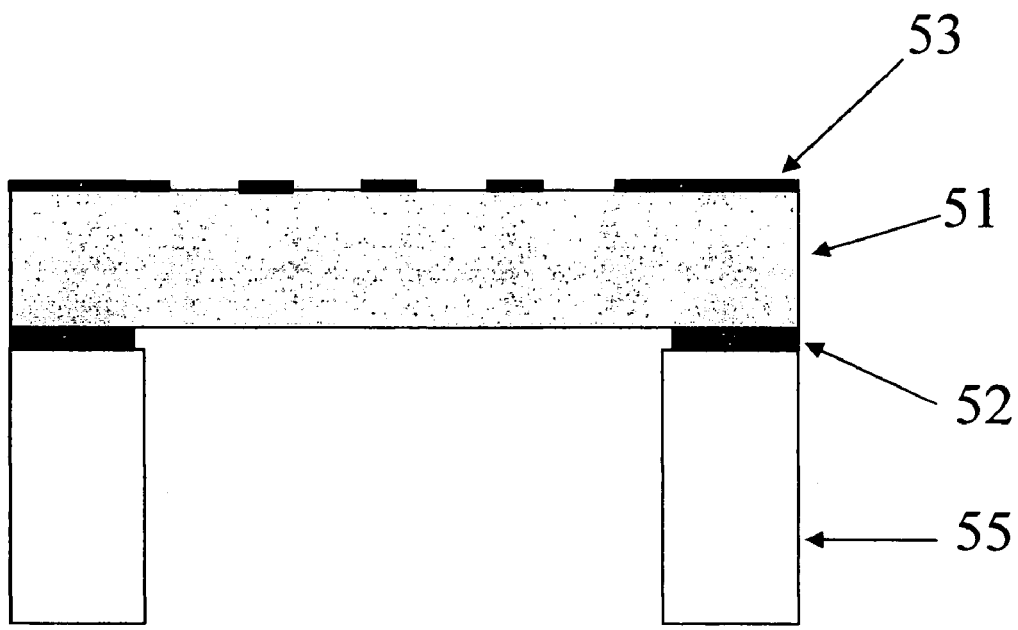
Figure 5H:
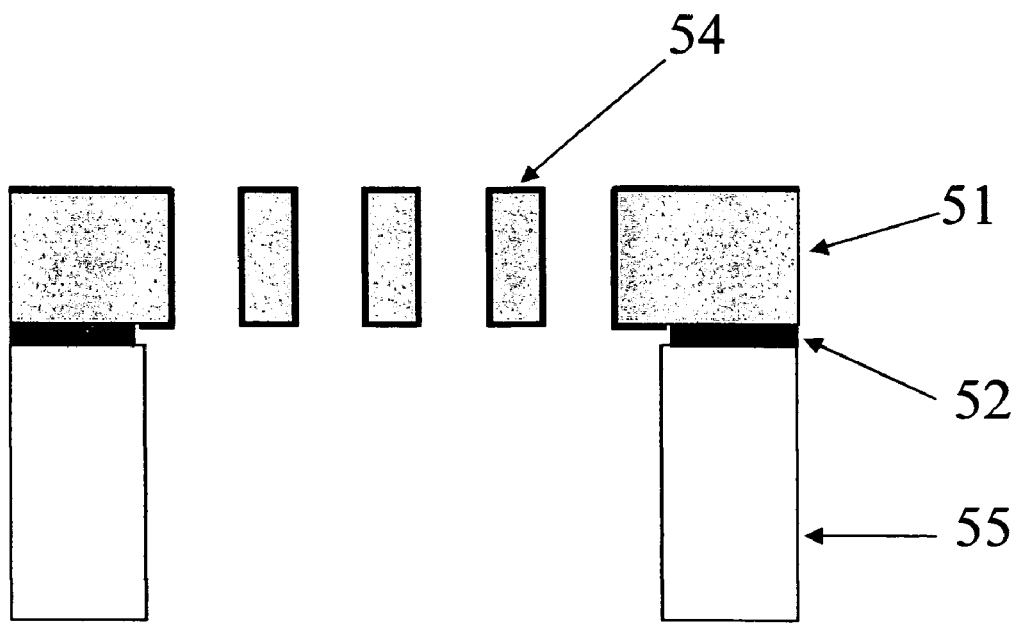

The order of the fabrication steps described above can be changed and the process can still obtain the desired structure at the end of the fabrication process. For example, one can start the fabrication process by removing a portion of the optional substrate layer 55 and subsequently removing the insulating layer 52 from the etched areas of the back side using wet etch or dry etch techniques. At this stage, a cross sectional view of the structure is shown in FIG. 5F. A masking layer 53 is then deposited and patterned as shown in FIG. 5G. The layer 51 is then etched, the masking layer 53 is removed, and reflective layer 54 is subsequently deposited as shown in FIG. 5H.

Figure 6A:
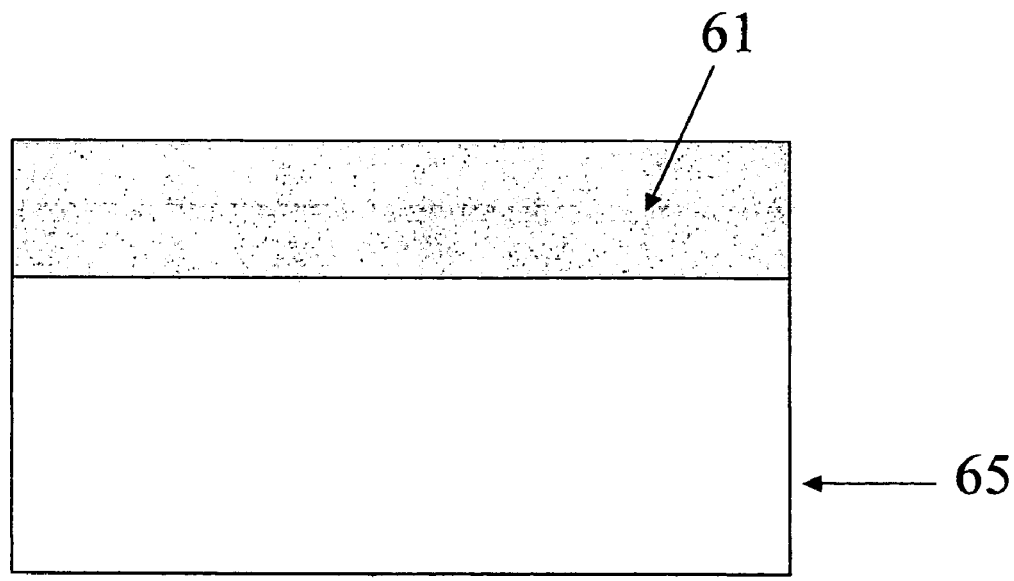
FIGS. 6A-6F show alternative fabrication steps of micro-tunnel arrays using various types of starting materials in accordance with an embodiment of the invention.
Figure 6B:
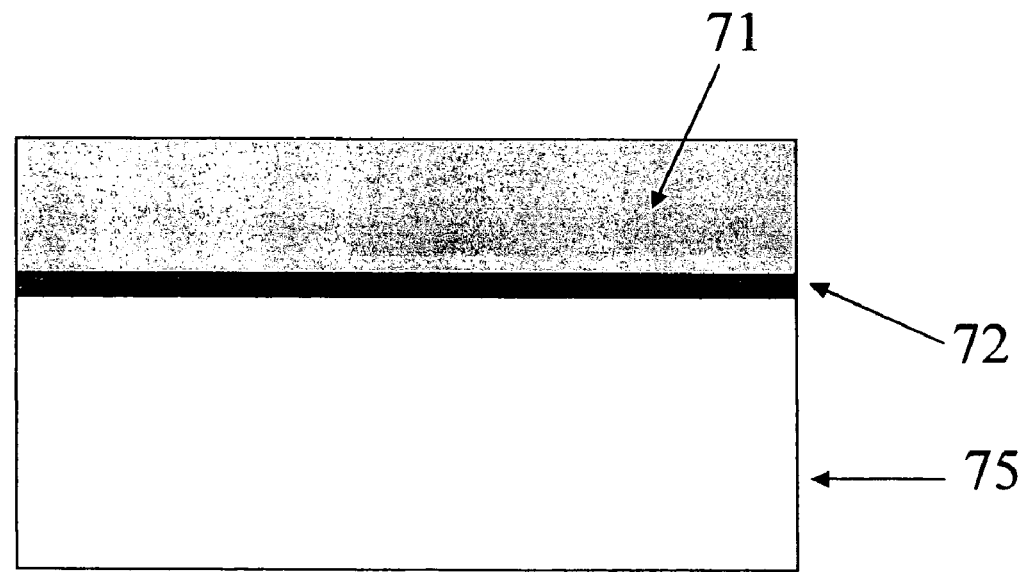

Micro-tunnel arrays can be fabricated using other starting materials, as shown in FIGS. 6A and 6B. FIG. 6A shows an n-type layer 61 grown on top of a p-type substrate 65. FIG. 6B shows n-type layer 71, highly-doped p-type silicon layer 72 and n-type or p-type substrate 75. Layer 72 serves as an etch stop during the backside etch of the substrate 75.

Figure 6C:
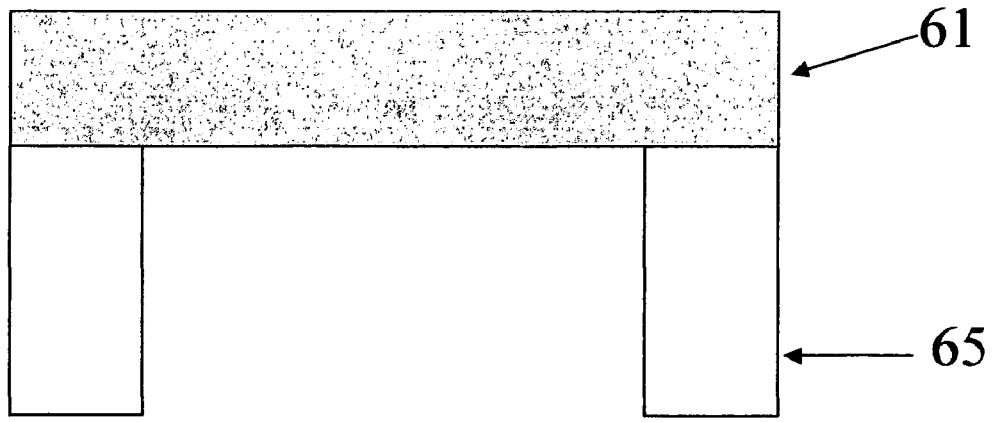
Figure 6D:
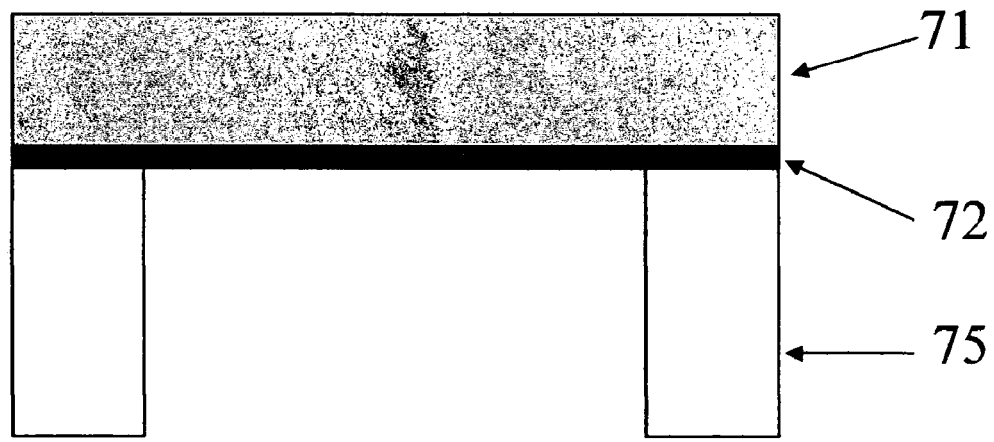

For substrates of FIG. 6A, the fabrication process preferably starts with etching a portion of the optional substrate layer 65 using wet etch methods such as electrochemical KOH. In an electrochemical KOH etch process, one layer 61 is biased in order to protect it during the etch process of a second layer 65. In this case, the etch process removes a portion of layer 65 and stops at the n-type silicon layer 61 as shown in FIG. 6C. If a highly doped layer p-type layer 72 (FIG. 6B) is present, electrochemical KOH etching will not be necessary and regular KOH etch will stop at layer 72 as shown in FIG. 6D.

Figure 6E:
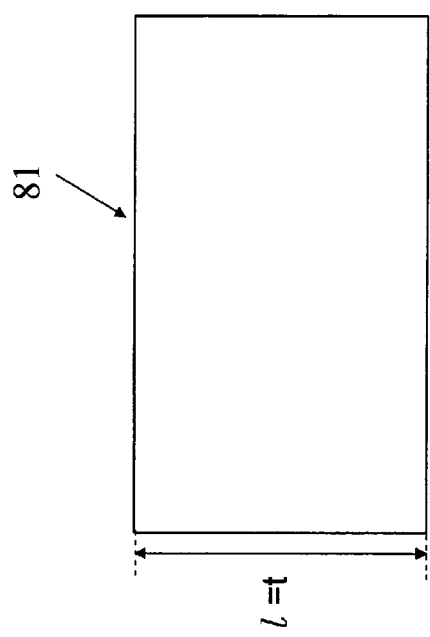

In addition or alternatively, a starting material can consist of a single layer 81 such as a p-type or n-type silicon as shown in FIG. 6E. In this case, the length of the micro-tunnels will be equal to the substrate thickness and there is no need to remove material from the backside of the substrate.

Figure 6F:
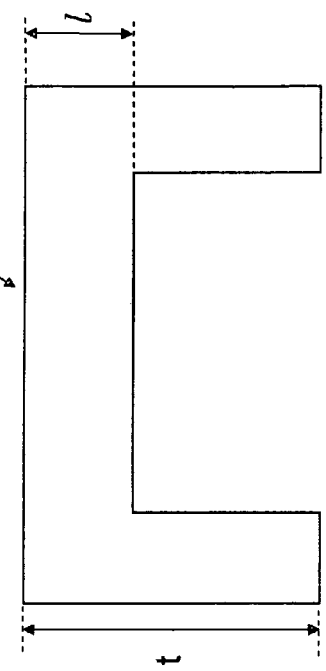

Alternatively, as shown in FIG. 6F, part of the substrate can be removed using timed wet or dry etch techniques to allow making micro-tunnels with length l less than the substrate thickness t. A timed etch eliminates the need for an etch stop layer. At this stage, the fabrication steps described in FIGS. 5G-5H can be used to complete the fabrication process of structures shown in FIGS. 6C-6F.

Figure 7A:
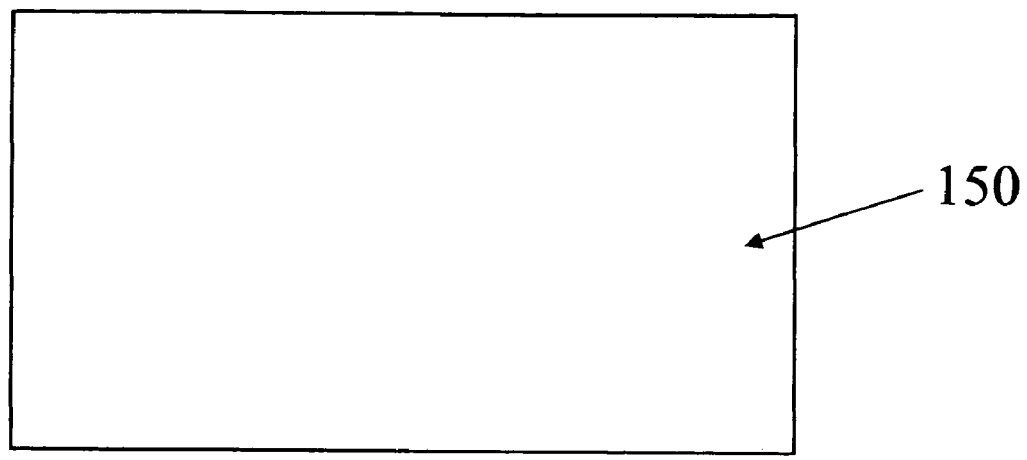
FIGS. 7A-7D show fabrication steps of micro-pipe arrays in accordance with an embodiment of the invention.

Fabrication steps of micro-pipe arrays 130 are shown in FIGS. 7A-7D. FIG. 7A shows a cross sectional view of an optically transparent substrate 150 taken along line B of FIG. 2K. The top and bottom sides of the substrate can be coated with an anti-reflective layer to reduce Fresnel reflections and enhance transmission efficiency of light.

Figure 7B:
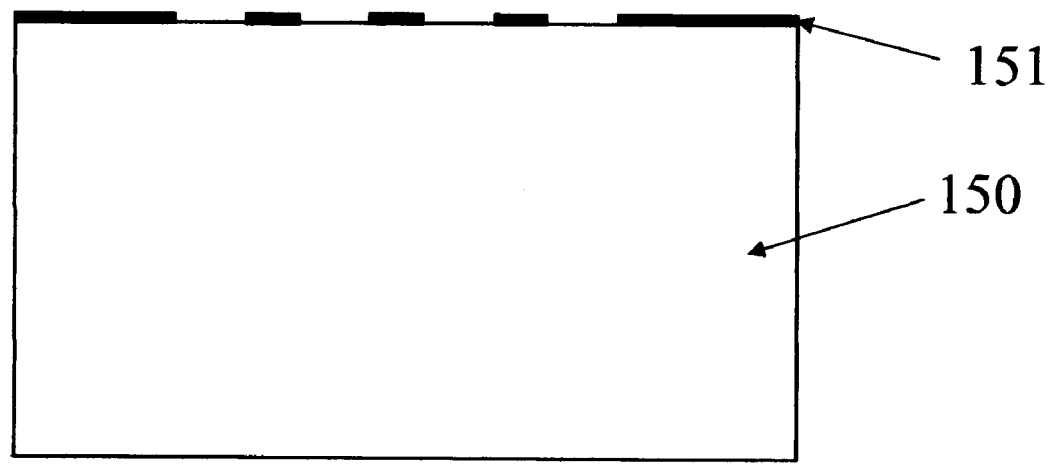
Figure 7C:
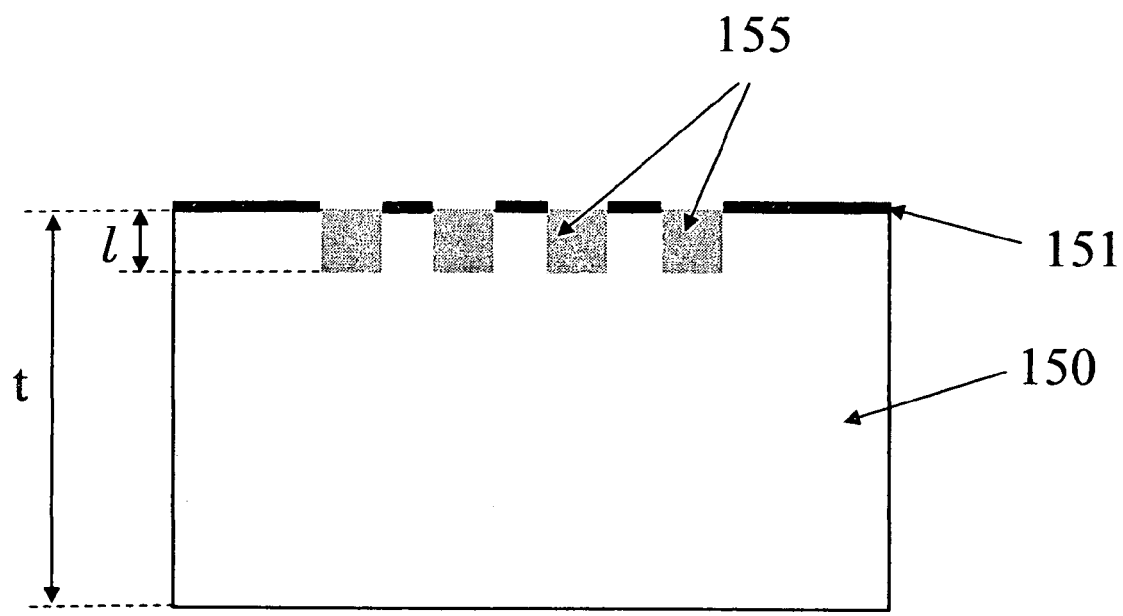
Figure 7D:
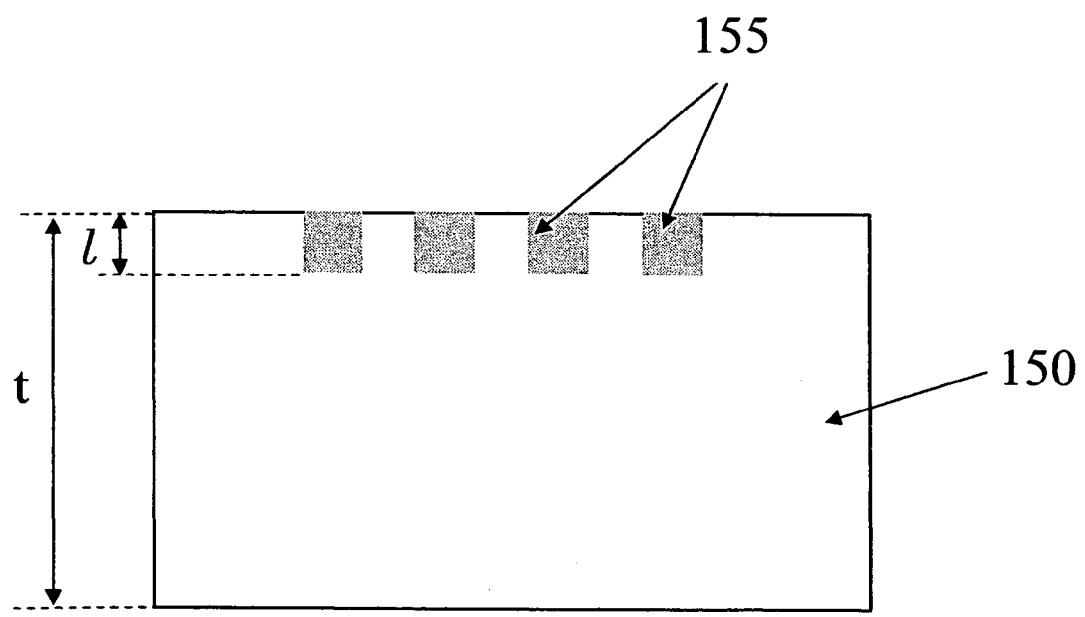

A layer 151 such as silicon oxide, silicon nitride or photoresist is deposited on top of substrate 150 and patterned as shown in FIG. 7B. This patterned layer 151 defines the micro-pipe array 130. An ion implantation and/or diffusion steps are subsequently performed leading to ions penetrating the substrate 150 surface in areas not covered by layer 151 to a depth l smaller than the substrate 150 thickness t. The layer 151 acts as an implantation or diffusion stop for preventing ions from penetrating areas of the substrate 150 located below layer 151 during the implantation or diffusion process. The layer 151 is then removed, resulting in a micro-pipe array 130 as shown in FIG. 7D. The index of refraction of these implanted regions 155 is decreased (or increased) in comparison to the non-implanted regions of the substrate 150.

A wide range of elements such as phosphorus, boron, or nitrogen can be implanted or diffused into the non-masked regions of the substrate 150. For example, it is possible to initially use ion implantation at room temperature to implant the substrate with the desired material at a certain depth below the substrate surface and then heat the substrate to a high temperature (e.g. 700-1200° C.) to diffuse the implanted material into a higher depth. Alternatively, the substrate can be coated and patterned with a certain material such as Al and Ni and then heated to a high temperature to diffuse the coated/patterned material into the substrate eliminating the need for a masking/stop layer.

The micro-tunnel and micro-pipe arrays disclosed herein have broad applications, including, but not limited to, projection displays such as projection TV, digital TV, home theater and monitors; direct-view displays and micro-displays used in gaming consoles, camcorders, cameras, cell phones, internet appliances, and headsets; lithography and photomask generation equipment; laser thermal processing; microscopy; fiber optic illumination; medical instrumentation and portable patient monitoring; GPS/navigation units; indicators on a car's dashboard; barcode scanners and test-and-measurement equipment.

While specific embodiments of the present invention have been shown and described, it will be apparent to those skilled in the art that the disclosed invention may be modified in numerous ways and may assume many embodiments other than those specifically set out and described above. Accordingly, the scope of the invention is indicated in the appended claims, and all changes that come within the meaning and range of equivalents are intended to be embraced therein.

What is claimed is:

1. A light guide array, comprising:
   a supporting material; and
   a plurality of light guides formed in the supporting material using a dry etch or a wet etch semiconductor fabrication technique, wherein each of the light guides is a hollow tunnel passing through the supporting material for guiding light through the supporting material, the hollow tunnel having an entrance aperture for receiving light and an exit aperture for outputting light, wherein an internal surface of the hollow tunnel is coated with a reflective material.

2. The light guide array of claim 1, wherein the hollow tunnel is straight.

3. The light guide array of claim 1, wherein the hollow tunnel is tapered.

4. The light guide array of claim 3, wherein the entrance aperture of the hollow tunnel is smaller than the exit aperture of the hollow tunnel.

5. The light guide array of claim 3, wherein the entrance aperture of the hollow tunnel is larger than the exit aperture of the hollow tunnel.

6. The light guide array of claim 1, wherein the internal surface of the hollow tunnel has a cold mirror coating.

7. The light guide array of claim 1, wherein the supporting material is selected from the group consisting of Al, Au, Ni, poly-silicon, SiC, GaAs, and an optically transparent material.

8. A light guide array, comprising:
   a supporting material having a first surface for receiving input light and a second surface for outputting light; and
   a plurality of light guides formed in the supporting material, each of the light guides having an entrance aperture on the first surface, an exit aperture on the second surface and a hollow tunnel passing through the supporting material from the entrance aperture to the exit aperture; and
   a reflective layer formed on the first surface around the entrance apertures and on internal surfaces of the hollow tunnels.

9. The light guide array of claim 8, wherein the internal surface of the hollow tunnel has a cold mirror coating.

10. The light guide array of claim 8, wherein the hollow tunnel is straight.

11. The light guide array of claim 8, wherein the hollow tunnel is tapered.

12. The light guide array of claim 11, wherein the entrance aperture of the hollow tunnel is smaller than the exit aperture of the hollow tunnel.

13. The light guide array of claim 11, wherein the entrance aperture of the hollow tunnel is larger than the exit aperture of the hollow tunnel.

14. The light guide array of claim 8, wherein the supporting material is selected from the group consisting of Al, Au, Ni, poly-silicon, SiC, GaAs, and an optically transparent material.

15. The light guide array of claim 1, further comprising a light-blocking coating on a surface of the supporting material surrounding the entrance apertures of the hollow tunnels.

16. The light guide array of claim 15, wherein the light-blocking layer is deposited on the surface of the supporting material using a deposition technique.

17. The light guide array of claim 1, wherein the supporting material is selected from the group consisting of silicon and silicon-on-insulator (SOI).

18. The light guide array of claim 8, wherein the light guides are formed in the supporting material using a dry etch or a wet etch semiconductor fabrication technique.

19. The light guide array of claim 8, wherein reflective layer is deposited on the first surface and internal tunnel surfaces using a deposition technique.

20. The light guide array of claim 8, wherein the supporting material is selected from the group consisting of silicon and silicon-on-insulator (SOI).

* * * * *